G. W. EDMOND, DEC'D.
L. C. EDMOND, EXECUTOR.
VEHICLE SIGNAL.
APPLICATION FILED DEC. 1, 1916.

1,243,824.

Patented Oct. 23, 1917.
2 SHEETS—SHEET 1.

WITNESSES

INVENTOR
G. W. Edmond
BY
ATTORNEYS

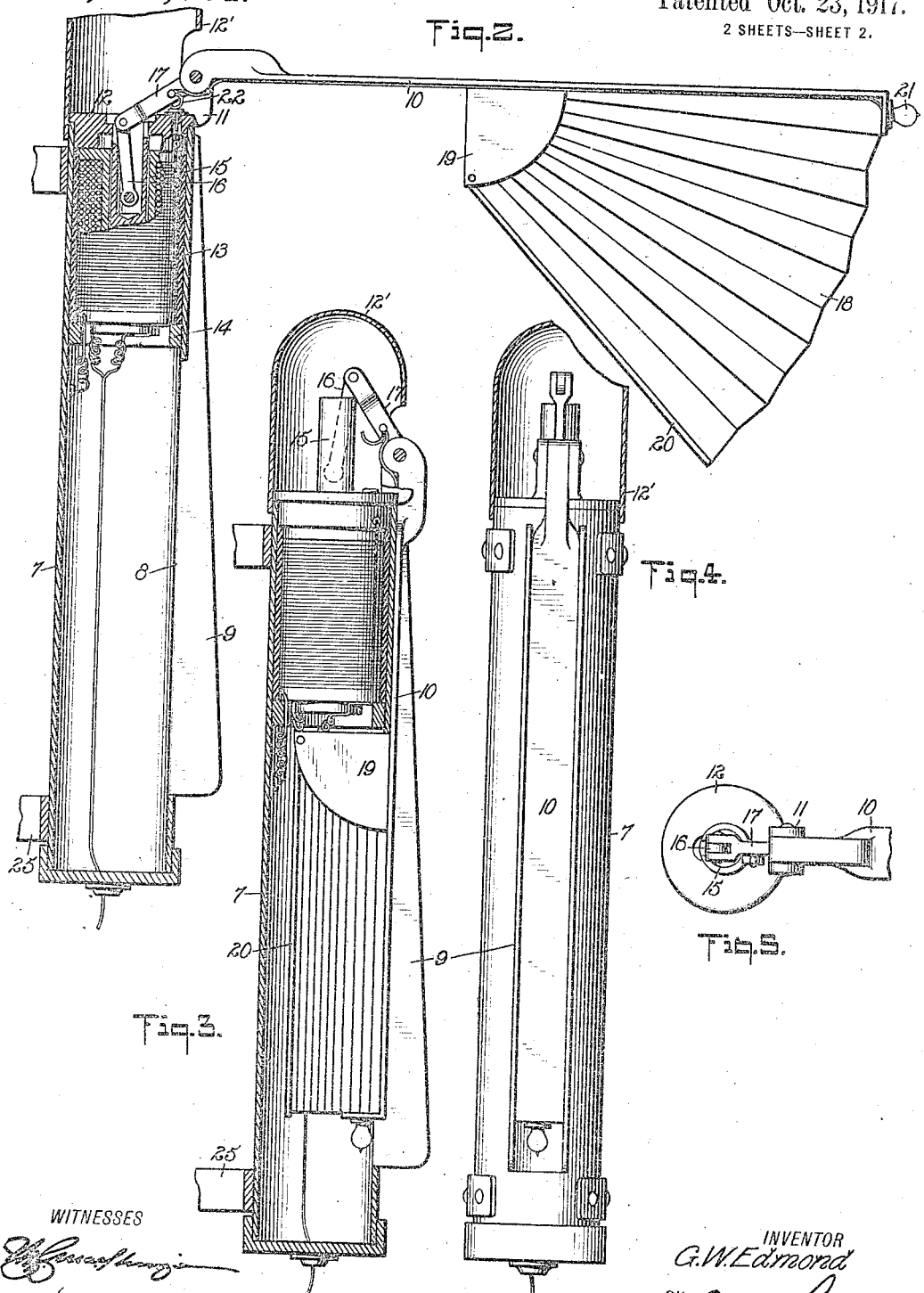

UNITED STATES PATENT OFFICE.

GEORGE WOODBRIDGE EDMOND, OF EL PASO, TEXAS; LEO C. EDMOND EXECUTOR OF SAID GEO. W. EDMOND, DECEASED.

VEHICLE-SIGNAL.

1,243,824.  Specification of Letters Patent.  Patented Oct. 23, 1917.

Application filed December 1, 1916. Serial No. 134,455.

*To all whom it may concern:*

Be it known that I, GEORGE W. EDMOND, a citizen of the United States, and a resident of El Paso, in the county of El Paso and State of Texas, have invented a new and Improved Vehicle-Signal, of which the following is a full, clear, and exact description.

My invention relates to signaling devices and is particularly suitable for use on automobiles to indicate a change of course.

An object of the invention is to provide a simple, inexpensive and efficient contrivance which can be easily applied to an automobile so as to become prominent when actuated to attract attention.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Fig. 3 is a similar section showing the signal in inoperative position;

Fig. 4 is an elevation of the mechanism in inoperative position;

Fig. 5 is a fragmentary top view on the signaling mechanism; and

Fig. 6 is a diagram of the circuit for operating the mechanism and energizing the light carried by the mechanism.

Figure 1:
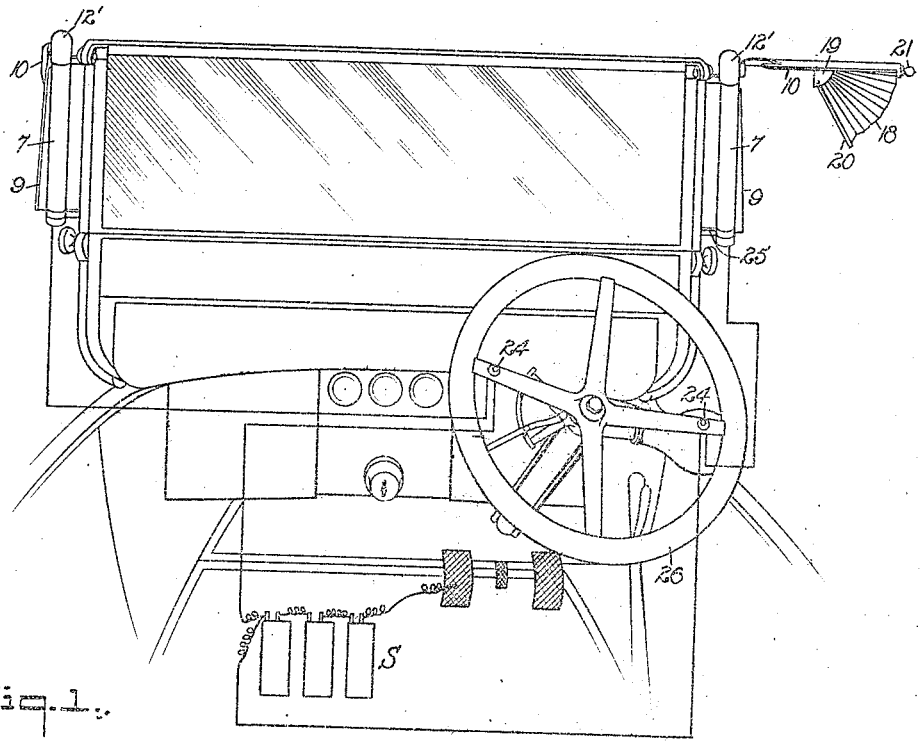
Figure 1 is a perspective elevation on a dashboard of an automobile, the windowshield frame of which is equipped with an embodiment of my invention, and also illustrating diagrammatically the control of the signals.

Referring to the drawings, 7 is a tubular shell forming the housing. It has a longitudinal slot or passage 8 which is bordered on the sides thereof by flanges 9, said flanges extending above the slot substantially to the upper end of the housing. These flanges constitute guiding means for an arm 10 pivotally connected to lugs 11 of a housing cover or head 12. The guiding flanges 9 when engaging the arm 10 prevent the arm from vibrating when the signal mechanism is subjected to the vibration of the moving vehicle to which the device is secured.

An electromagnet 13 is locked by the head 12 against an annular shoulder 14 provided within the housing 7. The electromagnet 13 has a movable core 15 which is hollow to accommodate a link 16, one end of which is connected to the core and the other to an extension 17 of the arm 10. A cap 12' is fitted over the head to protect the movable parts.

Normally gravity maintains the arm 10 between the flanges 9, as shown in Fig. 3. To move the arm to the operative position shown in Fig. 2, the electromagnet 13 is energized from a suitable source S; with automobiles the storage batteries are used as a source of supply. Between the source and the solenoid a suitable switch 24 is provided for controlling the current to the solenoid (see diagram Fig. 6).

Figure 2:
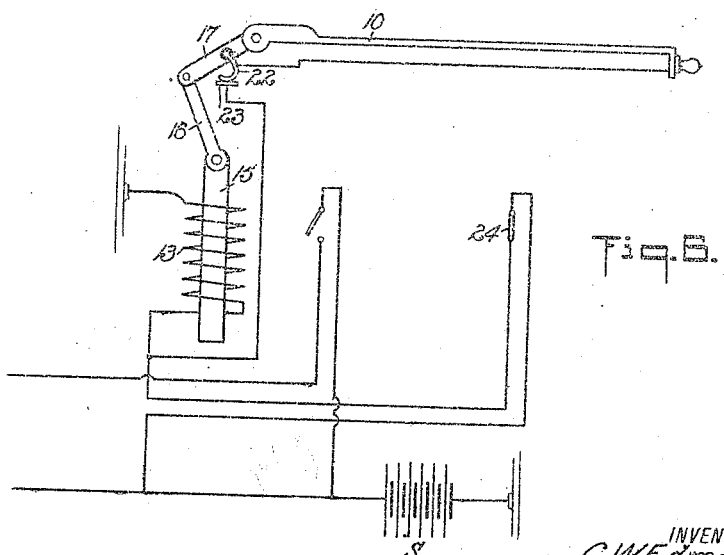
Fig. 2 is a sectional view through my signal mechanism in operative position.

To make the arm more prominent when thrown into the operative position, a foldable flag 18 is attached near the free end of the arm. The flag is preferably mounted in a bracket 19 extending from the arm. It will be seen that the flag will unfold automatically when the arm 10 is moved from the inoperative to the operative position through the medium of the solenoid and that it will automatically fold itself when the arm moves from its operative to its inoperative position. To facilitate the unfolding of the flag, a metallic member 20 is added to the edge of the flag not connected to the arm. To render the arm 10 apparent in the dark, an incandescent light 21 is provided at the extremity of the arm 10. This light becomes luminous when the arm 10 is brought to the operative position, as shown in Fig. 2. The source of current to the lamp is controlled by a yielding contact 22 carried by the extension 17 of the arm 10 which engages a fixed contact 23 provided on the head 12.

As shown in Fig. 1, there is a signal on each side of the automobile. Preferably the signal is secured to the wind shield frame by means of brackets 25 provided on the housing 7. Each device is operated from an independent switch 24, preferably located on the steering wheel 26. The switch controlling the right-side signal is located on the right side of the wheel, and that controlling the left-side signal, on the left side of the wheel. When the driver wishes to indicate a change of course to the right, he operates his right-hand signal by pressing the right-hand switch 24. In case he wants to stop the vehicle he operates the two signals at once, indicating that he is going to stop. The arms 10 when thrown into the operative position extend outwardly from the sides of the car and will be easily visible, and their visibility is considerably increased by the unfolding of the fan flags 18.

While I have described the principle of operation, together with the device which I now consider to be the best embodiment thereof, I desire to have it understood that the device shown is merely illustrative and that such changes may be made as are within the scope of the appended claims.

I claim:

1. A device of the class described, comprising a tubular shell having a longitudinal slot, flanges bordering the sides of the slots and extending to the top of the housing, a head for said housing presenting lugs, an arm pivotally connected with one end to said lugs, and adapted to be maintained by gravity between the flanges at the slot, a foldable member connected to the arm and adapted to pass in and out of the housing through the slot, a member associated with the foldable member and pivotally connected to the arm so as to swing under the action of gravity, whereby said foldable member is unfolded when the arm is moved out from between the flanges, and electromagnetic means arranged within the housing and connected to the arm for actuating the same.

2. A device of the class described, comprising a tubular shell having a longitudinal slot, flanges bordering the sides of the slot, a head for said housing presenting lugs, an arm pivotally connected to said lugs and adapted to be maintained by gravity between the flanges at the slot, a fan-shaped foldable member connected to the arm and adapted to pass in and out of the housing through the slot, said foldable member being so connected that gravity will tend to unfold it when said arm is moved away from the housing, and electromagnetic means within the housing in operative connection with the arm for actuating the same.

3. A device of the class described, comprising a tubular shell having a longitudinal slot, flanges bordering the sides of the slot, a head for said housing presenting lugs, an electromagnet within the housing and locked thereto by said head, an arm pivotally connected to the lugs and adapted to be maintained between the flanges under the action of gravity, a movable core in said electromagnet, links connecting the movable core to the arm so that when the electromagnet is energized the arm is caused to move on its pivot against the action of gravity, a fan-shaped foldable member connected to the arm so as to unfold when the arm is moved from the housing, and a member associated with the foldable fanlike member and pivotally connected to the arm to facilitate the unfolding of the fanlike member under the action of gravity, said member and fan-shaped foldable member being adapted to be accommodated in the housing and pass through the longitudinal slot.

GEORGE WOODBRIDGE EDMOND.